United States Patent [19]
Prince

[11] 4,194,585
[45] Mar. 25, 1980

[54] INSTRUMENT MOUNTING SYSTEM

[75] Inventor: Edgar D. Prince, Holland, Mich.

[73] Assignee: Prince Corporation, Holland, Mich.

[21] Appl. No.: 928,241

[22] Filed: Jul. 26, 1978

[51] Int. Cl.² ............................................. B60K 37/04
[52] U.S. Cl. ................................... 180/90; 296/70
[58] Field of Search .......................... 180/90; 296/70; 248/27.1

[56] References Cited
U.S. PATENT DOCUMENTS

| | | | |
|---|---|---|---|
| 3,174,576 | 3/1965 | Woofter et al. | 180/90 |
| 3,282,622 | 11/1966 | Komenda | 296/70 |
| 3,590,136 | 6/1971 | Kunishi | 180/90 |
| 3,896,448 | 7/1975 | Killen et al. | 180/90 |

*Primary Examiner*—Robert R. Song
*Attorney, Agent, or Firm*—Price, Heneveld, Huizenga & Cooper

[57] ABSTRACT

A system for mounting instruments such as CB radios, tape players, or other vehicle electronic systems such as computers in the dashboard opening of the ventilation system of a vehicle includes an adaptor plenum, housing and faceplate for redirecting the vehicle's output ventilators and providing adjacent space in the housing for the mounting of an electronic instrument. Such a system incorporates the existing ventilating system opening for the addition of after-market electronic systems to achieve a factory installed design appearance and to conveniently position the electronic instrument for use by the vehicle operator.

19 Claims, 4 Drawing Figures

INSTRUMENT MOUNTING SYSTEM

BACKGROUND OF THE INVENTION

The present invention relates to a mounting system for adding vehicle electronic instruments to a vehicle.

With the increasing popularity of vehicle electronics such as CB radios, tape decks, and more recently electronic computers such as disclosed in U.S. Pat. application Ser. No. 821,779, filed Aug. 4, 1977, entitled VEHICLE POSITION INDICATOR, and assigned to the present assignee, mounting of such add-on equipment in the somewhat crowded dashboard area of the increasingly compact motor vehicles is difficult.

In the first instance, the compact size of newer vehicles leaves little space for mounting such add-on units. It is important that they be mounted where they can be readily accessible to the vehicle operator for convenience of operation. Also, they should be mounted in a location where they will not pose a safety hazard such as obstructing visibility through the windshield or providing edges which could cause injury to a passenger or operator entering or leaving the vehicle or in the event of an accident. Naturally, vehicle radios are available as factory installed equipment and in such installations, they fit into a housing as an integral part of the dashboard. Frequently, however, the vehicle owner desires to add accessories such as electronic instruments subsequent to the purchase of the vehicle.

Nearly all vehicles now include dashboard ventilating systems with air flow directions frequently incorporated as part of the vehicle's air conditioning system. Even in vehicles without air conditioning, however, flow through ventilation systems with such output vents near the center of the dashboard are common. It has been discovered that the removal of the existing faceplate including the flow directors exposes a relatively large aperture through the dashboard and can accommodate a mounting system such as the present invention for integrally mounting the flow directors and an additional accessory such as an electronic device to the existing dashboard opening. This solves the problem of providing a convenient and accessible mounting location for add-on electronic systems since the system is in the center of the dashboard and easily accessible by the vehicle operator and at the same time provides a factory installed appearance to the unit which is desirable for the vehicle owner.

SUMMARY OF THE INVENTION

The present invention comprises a housing having a first end shaped to conform to an opening in a vehicle provided by the removal of an accessory and a second end spaced from the first end and sufficiently large to receive the removed accessory and an additional accessory and means for mounting the accessories to the adaptor housing which in turn is mounted to the vehicle.

These and other features, advantages, and objects of the present invention can best be understood by reference to the following description thereof together with the accompanying drawings in which:

DETAILED DESCRIPTION OF THE PREFERRED EMBODIMENT

Figure 1:
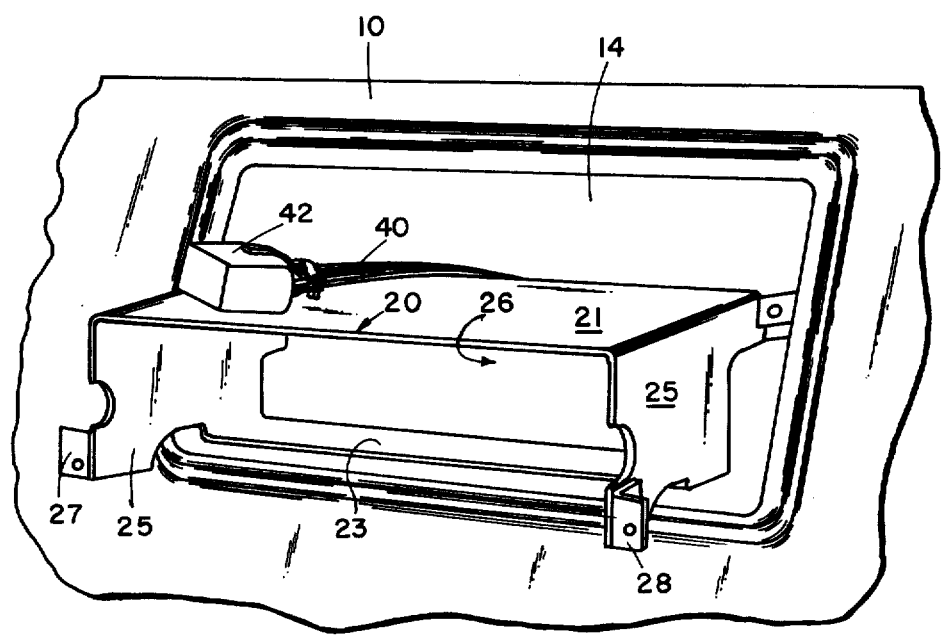
FIG. 1 is a perspective view of an adaptor plenum constructed according to one embodiment of the present invention shown mounted to an existing vent mounting aperture in a vehicle's dashboard.

Referring initially to FIG. 1, there is shown the center portion of a vehicle dashboard 10 typically located between the driver's side and passenger's side above the vehicle's radio or air conditioning and ventilating control instruments. The dashboard includes an aperture 14 for receiving a bezel with typically two or more adjustable air deflectors which have been removed in FIG. 1. Behind the dashboard at this location there is provided an air duct 16 (FIG. 4) which communicates with the heating, cooling, and ventilating system of the vehicle to provide forced air to a supply plenum 18 which normally is coupled to the removed bezel plate to provide forced air to the deflectors.

Figure 2:
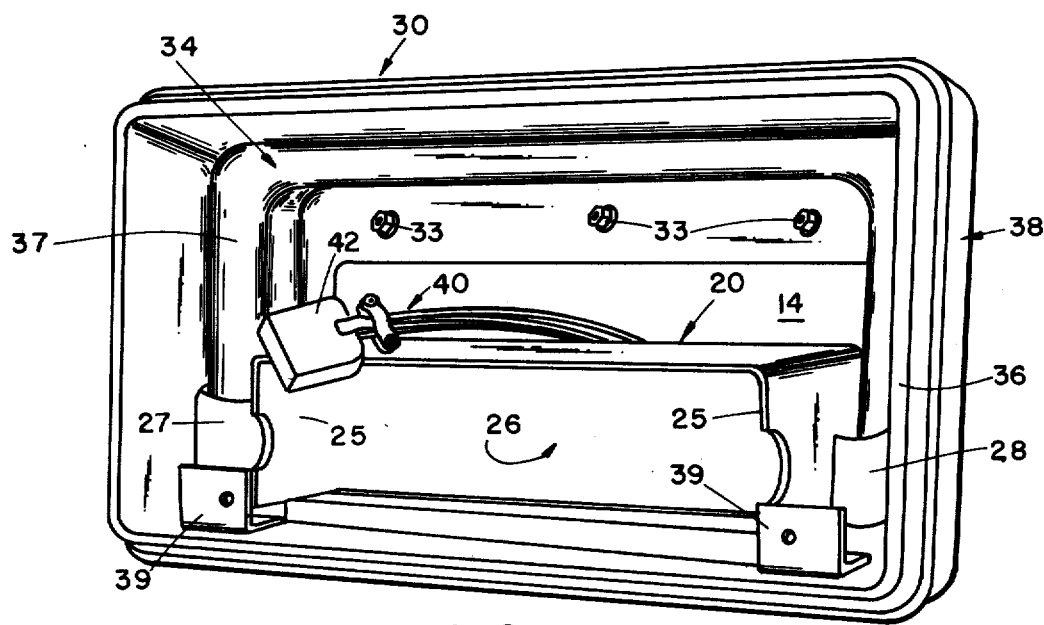
FIG. 2 is a perspective view of the structure shown in FIG. 1 together with an adaptor housing mounted to the vehicle's dashboard.
Figure 3:
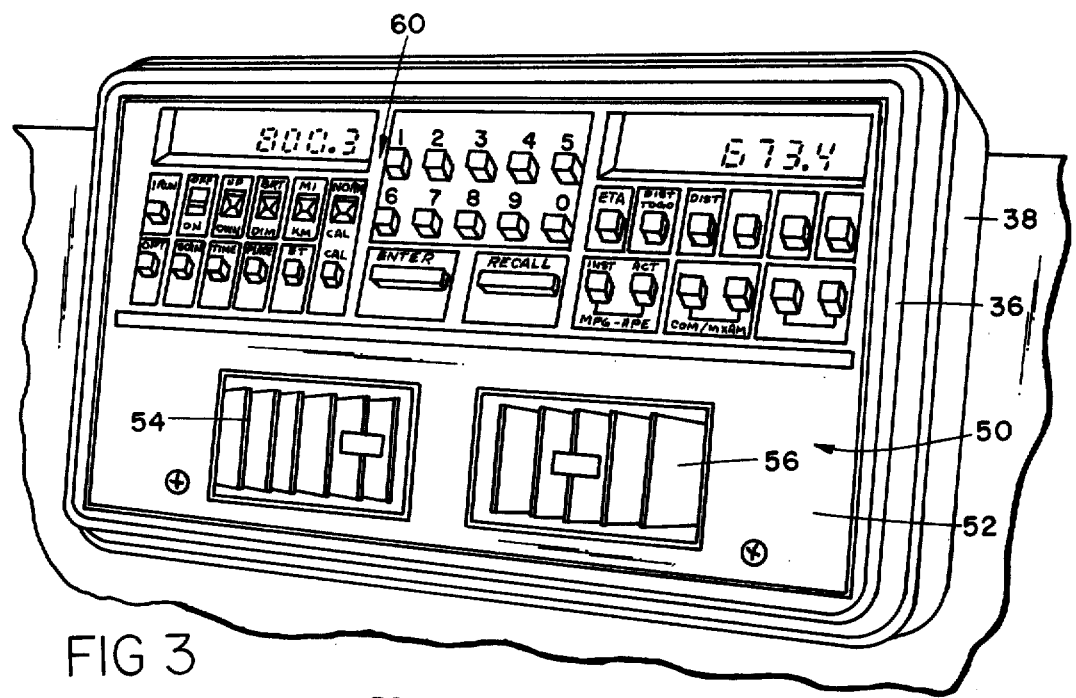
FIG. 3 is a perspective front elevational view of the present invention shown in its completely assembled form.
Figure 4:
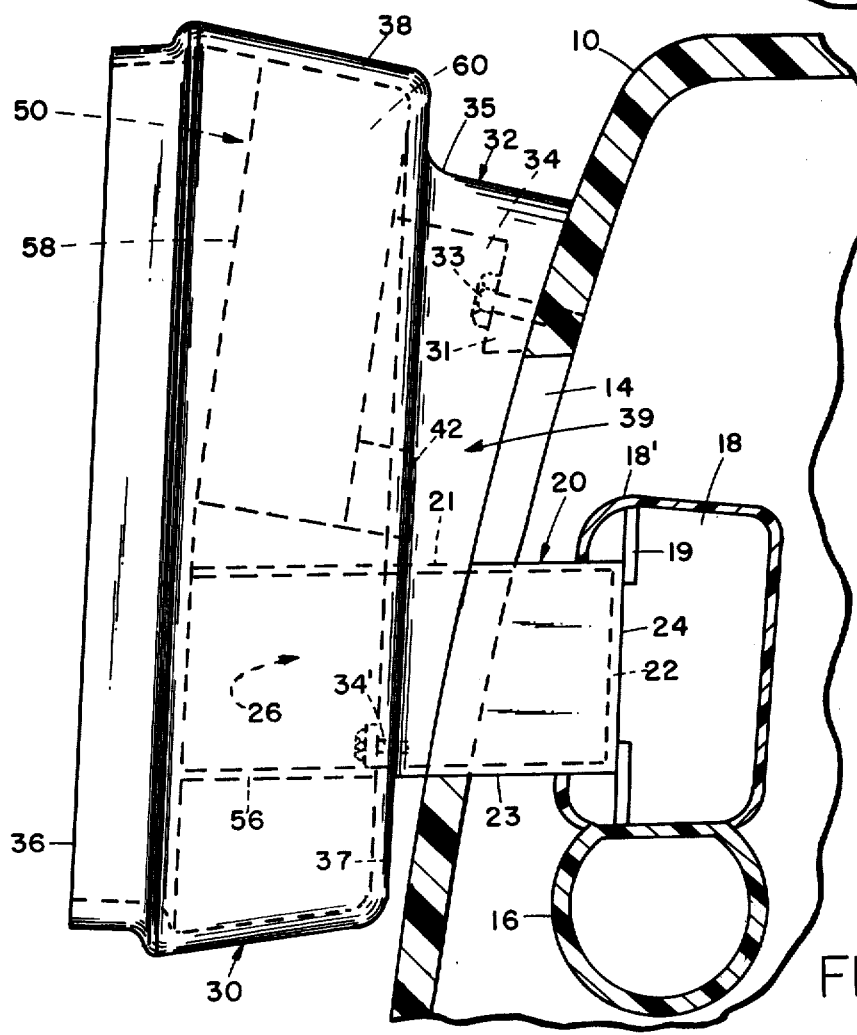
FIG. 4 is a right side elevational view partly in cross section of the structure shown in FIG. 3.

In place of the original equipment, bezel, and deflectors, inserted as shown in FIGS. 1 and 4 is an adaptor plenum 20 comprising a generally rectangular elongated member injection molded or vacuum formed of ABS plastic or assembled from a fiberboard material. The adaptor plenum 20 includes a rectangular rear opening 22 having a foam sealing material 24 around its peripheral edge. The plenum so formed is defined by an upper wall 21, a lower wall 23, and sidewalls 25 with the gasket material 24 joined to the edges of these walls at the first or rear opening of the plenum. The opposite end of plenum 20 includes a front opening 26 for supplying output air from the plenum. The gasket material 24 as seen in FIG. 4 seals against a mounting surface 19 of the connector plenum to provide an airtight fit. Depending on the particular vehicle in which the adaptor plenum is employed, the shape of the rear opening 22 is varied by varying the size and/or shape of the walls of the plenum to fit into supply plenum 18. In the embodiment shown, the supply plenum 18 includes a rim 18' for providing a mechanical connection to the adaptor plenum 20. Thus, the adaptor plenum 20 slides into place in the existing vehicle structure. Along the front opening 26 of plenum 20 extending from sidewalls 25 there is provided a pair of outwardly projecting L-shaped mounting tabs 27 and 28 for securing the forward edge of the plenum to the adaptor housing 30 (FIGS. 2, 3, and 4).

Generally, the adaptor plenum 20 will have dimensions which are slightly smaller than the original aperture 14 in the dashboard to permit an electrical cable 40 (FIGS. 1 and 2) to extend between the upper surface 21 of the adaptor plenum and the edge of aperture 14. Cable 40 includes a connector 42 at its end which is adapted to be coupled to the electrical instrument installed according to the present invention for supplying operating power to the instrument as well as electrical inputs and outputs from the sensors as required.

Housing 30 is generally rectangular and comprises a forward accessory mounting section 38 and a rearward dashboard mounting section 32. Section 38 has a larger area in which to mount accessories than opening 14 in the dash. Thus, housing 30 expands the available mounting area of the dash or other portion of the vehicle to which it is attached. As best seen in FIG. 4, mounting section 32 has a flange 31 extending downwardly from the rear edge of upper wall 35. The rear edge or surface 33 of housing 30 is shaped to conform to the contour of the dash 10. Also, the walls defining the open end 34 of section 32 are shaped such that they enclose opening 14 on the dash. Fastening bolts 33' secure the housing to the dashboard with the rectangular rear opening 34 of the housing 30 mating with aperture 14 of the dashboard. The top wall 35 of the housing is longer than the lower wall to position the forward edge 36 of the housing in a generally vertical plane in the preferred embodiment. The housing shown is particularly adapted to compliment the design appearance of a 1978 Chevrolet Monte Carlo model and its companion vehicles it being understood that section 32 can be designed to accommodate the dashboard inclination of a wide variety of vehicles to achieve the generally vertical orientation of the front 36 of the housing.

Housing 30 includes a generally rectangular accessory mounting section 38 integral with section 32 and comprising an upper wall, a lower wall, and sidewalls and a front decorative rectangular edge 36 defining an open second end of the housing. Along the inside lower wall of section 38 of housing 30 there is provided a pair of L-shaped mounting tabs 39 (FIG. 2) facilitating the mounting of a face plate 50 (FIG. 3) into the housing with the faceplate being recessed slightly behind the front surface of rim 36. The mounting tabs 27 and 28 of plenum 20 seat against the forwardly facing internal rectangular rim 37 (FIG. 2) of housing 30 and can be secured thereto by means of fastening bolts 34' (FIG. 4) or a suitable bonding adhesive. If necessary, housing 30 may also include a pair of upper tabs (none shown) for securing faceplate 50 both at the lower and upper ends with respect to the housing. Similarly section 32 may include as necessary additional mounting flanges for securing the housing to the vehicle.

A passageway 39' (FIG. 4) extends between the first open end 34 of housing 30 and its second open end surrounded by rim 36. Passageway 39' thus provides room for receiving plenum 20, cable 40 and an electronic instrument 60. In the preferred embodiment, passageway 39' is the entire inner space defined by the walls of the housing. In other embodiments where different accessories are mounted, significantly smaller or different shaped passageways may be employed.

As best seen in FIGS. 3 and 4, the faceplate 50 includes a lower half 52 with a pair of apertures forming means for receiving a pair of standard ventilator deflectors 54 and 56 which extend rearwardly into sealed engagement with the front opening 26 of plenum 20. Deflectors 54 and 56 have adjustable louvers for directing the air flow therefrom. The upper portion 58 of faceplate 50 is inclined rearwardly about 10° to 20° and includes an aperture defining means for receiving the electronic package 60 which in the preferred embodiment comprises a vehicle computer of the type described in the above identified co-pending application, Ser. No. 821,779. It will be appreciated that in some embodiments of the present invention, housing 30 may integrally include a faceplate 50 although it is preferred to provide a separate faceplate which can be configurated in design and shape to correspond to an existing vehicle interior appearance. Similarly, housing 30 can be shaped to conform to the vehicle's interior design.

In the preferred embodiment, housing 30 is made by molding a self-skinning urethane material which is then foamed behind the urethane skin having a desired textured surface and subsequently painted with a urethane based paint to match the vehicle's interior color. Alternatively, the housing can be molded of vinyl or polyvinyl chloride (PVC) colored to match the vehicle's interior. The molding techniques and materials are conventional and commonly in use in the automotive industry. Faceplate 50 is injection molded of a polycarbonate material.

By reducing or increasing the size of the aperture provided in the upper segment 58 of the faceplate, housing 30 can receive any number of accessories and electronic instruments such as tape players, CB radios, or the computer shown in the preferred embodiment. If desired, the faceplate can include knockout holes of standard dimensions for receiving different electrical packages or accessories so that a single faceplate can be universally used for a variety of applications. Instead of mounting the adaptor housing to the dashboard, it could be mounted in other areas of the vehicle such as a center console or wherever an existing accessory can be removed and relocated to form a mounting area for the housing.

These and other modifications to the preferred embodiment of the invention shown and described herein will become apparent to those skilled in the art and will fall within the spirit and scope of the present invention as defined by the appended claims.

The embodiments of the invention in which an exclusive property or privilege is claimed are defined as follows.

1. A system for mounting an accessory to a vehicle comprising:
   an adaptor housing having a first end shaped to fit over an opening in the vehicle formed by the removal of a vehicle's accessory, and a second end spaced from said first end and having an opening sufficiently large to accommodate the removed vehicle's accessory and an additional accessory to be mounted to the vehicle, said adaptor housing including a passageway extending between said first and second ends to provide access therebetween;
   means for securing said housing to the vehicle with said first end in alignment with the opening; and
   means for securing the vehicle's accessory and an additional accessory to said housing to be accessible from said second end.

2. The system as defined in claim 1 wherein said first and second ends of said adaptor housing are open.

3. The system as defined in claim 2 wherein the opening is formed in the vehicle's dashboard and wherein said first end of said adaptor housing has a rear surface shaped to fit the contour of the vehicle's dashboard surrounding the opening.

4. The system as defined in claim 3 wherein the opening is provided by removal of a ventilation outlet and said system further includes an adaptor plenum extending through said passageway and having a first end coupled to the vehicle's ventilating system and a second end projecting toward said first end of said adaptor housing.

5. The system as defined in claim 4 wherein said means for securing the vehicle's accessory and an additional accessory comprises a faceplate including means for receiving an additional accessory and for receiving a ventilator outlet, said faceplate further including means for securing said faceplate to said second end of said housing.

6. The system as defined in claim 5 wherein said means for securing said adaptor housing to said vehicle comprises a flange including aperture means for receiving fastening bolts.

7. The system as defined in claim 6 wherein said adaptor housing is colored to match the color of the vehicle's dashboard.

8. A method for installing accessories to a vehicle comprising the steps of:
removing an existing vehicle accessory to provide a mounting aperture;
securing an adaptor housing to the edge of the mounting aperture, wherein the adaptor housing has an opening sufficiently large to receive the removed accessory and an additional accessory;
mounting the removed accessory to the adaptor housing; and
mounting the additional accessory to the adaptor housing.

9. A mounting system for securing an electronic instrument to a ventilation opening in the dashboard of a vehicle comprising:
an adaptor plenum having a first end extending into the ventilation opening in the dashboard and adapted to communicate with the vehicle's ventilating system and a second end extending outwardly from the dashboard;
an adaptor housing having walls defining a first open end and a second open end and a passageway extending between said first and second open ends, wherein said adaptor plenum extends into said passageway and wherein said first open end is shaped to fit over the ventilation opening in the dashboard, said adapter housing including means for securing said first open end to said dashboard, said second open end being larger than said first open end; and
a faceplate and means for securing said faceplate to said second open end of said adaptor housing, said faceplate including means for receiving an electronic instrument which extends into said adaptor housing from said faceplate, said faceplate further including means for receiving air outlet means communicating with said second end of said adaptor plenum.

10. The system as defined in claim 9 wherein said first end of said adaptor housing has a rear surface shaped to fit the contour of the vehicle's dashboard surrounding the ventilation opening.

11. The system as defined in claim 10 wherein said means for securing said first end of said adaptor housing to said vehicle dashboard comprises a flange including aperture means for receiving fastening bolts.

12. The system as defined in claim 11 wherein said adaptor housing is colored to match the color of the vehicle's dashboard.

13. A system for mounting an accessory to a vehicle comprising:
an adaptor housing having a first end shaped to fit over an opening in the vehicle formed by the removal of a vehicle's accessory, and a second end spaced from said first end and having an opening sufficiently large to accommodate a replacement for the removed vehicle's accessory and an additional accessory to be mounted to the vehicle, said adaptor housing including a passageway extending between said first and second ends to provide access therebetween;
means for securing said housing to the vehicle with said first end in alignment with the opening; and
means for securing the vehicle's replacement accessory and an additional accessory to said housing to be accessible from said second end.

14. The system as defined in claim 13 wherein said first and second ends of said adaptor housing are open.

15. The system as defined in claim 14 wherein the opening is formed in the vehicle's dashboard and wherein said first end of said adaptor housing has a rear surface shaped to fit the contour of the vehicle's dashboard surrounding the opening.

16. The system as defined in claim 15 wherein the opening is provided by removal of a ventilation outlet and said system further includes an adaptor plenum extending through said passageway and having a first end coupled to the vehicle's ventilating system and a second end projecting toward said first end of said adaptor housing.

17. The system as defined in claim 16 wherein said means for securing the vehicle's replacement accessory and an additional accessory comprises a faceplate including means for receiving an additional accessory and for receiving a ventilator outlet, said faceplate further including means for securing said faceplate to said second end of said housing.

18. The system as defined in claim 17 wherein said means for securing said adaptor housing to said vehicle comprises a flange including aperture means for receiving fastening bolts.

19. The system as defined in claim 18 wherein said adaptor housing is colored to match the color of the vehicle's dashboard.

* * * * *